United States Patent
Li et al.

(10) Patent No.: US 8,200,038 B2
(45) Date of Patent: Jun. 12, 2012

(54) IMAGE PROCESSING APPARATUS AND IMAGE PROCESSING METHOD

(75) Inventors: Jyun-Sian Li, Tainan (TW); Chih-Chang Lai, Taichung County (TW); Ruey-Shing Weng, Kaohsiung (TW); Ching-Fu Hsu, Taichung County (TW)

(73) Assignee: Wintek Corporation, Tepz Tantzu, Taichung (TW)

( * ) Notice: Subject to any disclaimer, the term of this patent is extended or adjusted under 35 U.S.C. 154(b) by 822 days.

(21) Appl. No.: 12/352,707

(22) Filed: Jan. 13, 2009

(65) Prior Publication Data

US 2009/0180707 A1 Jul. 16, 2009

(30) Foreign Application Priority Data

Jan. 14, 2008 (TW) .............................. 97101353 A

(51) Int. Cl.
*G06K 9/64* (2006.01)
(52) U.S. Cl. .................... 382/279; 382/254; 382/266
(58) Field of Classification Search .................. None
See application file for complete search history.

(56) References Cited

U.S. PATENT DOCUMENTS 5,682,443 A * 10/1997 Gouch et al. ................ 382/254
2008/0199101 A1* 8/2008 Sumiya et al. ............... 382/266

OTHER PUBLICATIONS

Gregory A. Baxes, "Digital Image Processing—Principles and Applications", 1994, John Wiley $ Sons, Inc., pp. 88-98, and 436.*

* cited by examiner

*Primary Examiner* — Jason M Repko
*Assistant Examiner* — Siamak Harandi
(74) *Attorney, Agent, or Firm* — Thomas|Kayden

(57) ABSTRACT

An image processing apparatus and an image processing method. The image processing apparatus includes a first convolution unit, a weight generator, a second convolution unit, an arithmetic unit and an outputting unit. The first convolution unit performs a convolution to output edge strength according to an original image signal and a high pass filter mask. The weight generator chooses a weight coefficient according to the edge strength. The second convolution unit performs a convolution to output an unsharp image signal according to the original image signal and a low pass filter mask. The arithmetic unit outputs a first sharpening signal according to the original image signal, the unsharp image signal and the weight coefficient. The outputting unit outputs a processed image signal according to the original image signal and the first sharpening signal.

17 Claims, 7 Drawing Sheets

140

150(1)

150(2)

| -1 | -1 | -1 |
|----|----|----|
| -1 | 8  | -1 |
| -1 | -1 | -1 |

FIG. 12

| 1/9 | 1/9 | 1/9 |
|-----|-----|-----|
| 1/9 | 1/9 | 1/9 |
| 1/9 | 1/9 | 1/9 |

FIG. 13

| 1/16 | 2/16 | 1/16 |
|------|------|------|
| 2/16 | 4/16 | 2/16 |
| 1/16 | 2/16 | 1/16 |

FIG. 14

IMAGE PROCESSING APPARATUS AND IMAGE PROCESSING METHOD

This application claims the benefit of Taiwan application Serial No. 97101353, filed Jan. 14, 2008, the subject matter of which is incorporated herein by reference.

BACKGROUND OF THE INVENTION

1. Field of the Invention

The invention relates in general to an image processing apparatus and an image processing method, and more particularly to an image processing apparatus and an image processing method capable of enhancing a frame quality and capable of correctly displaying texts.

2. Description of the Related Art

An image may be defined as a two-dimensional function f(x,y), wherein x and y are spatial coordinates. The size of "f" on one pair of coordinate axes (x,y) is referred to as an intensity or a gray level of the image at this pel.

The image is composed of limited elements each having a specific position and a specific value. These elements are referred to as picture elements, image elements, pels or pixels.

In order to make the image have the better representing effect, the conventional image processing apparatus and the conventional image processing method perform the image processing on the original image so that the processed image can achieve the predetermined target.

However, when the conventional image processing apparatus and the conventional image processing method are scanning, printing or photographing, the image edges are often blurred or distorted. In addition, the conventional image processing apparatus and the conventional image processing method tend to cause the image to be over-sharpened so that the texts cannot be correctly displayed.

SUMMARY OF THE INVENTION

The invention is directed to an image processing apparatus and an image processing method, wherein a weight coefficient of each pixel is determined according to the edge strength of an image, a smaller weight coefficient is assigned to the pixel of the image having the larger edge strength, and a larger weight coefficient is assigned to the pixel of the image having the smaller edge strength. Thus, the blurred region in the original image can be effectively enhanced. Also, the following embodiments can avoid the defect caused by the over-enhancement so that texts can be correctly displayed and the better display effect can be achieved.

According to a first aspect of the present invention, an image processing apparatus is provided. The image processing apparatus includes a first convolution unit, a weight generator, a second convolution unit, an arithmetic unit and an outputting unit. The first convolution unit performs a convolution to output edge strength according to an original image signal and a high pass filter mask. The weight generator chooses a weight coefficient according to the edge strength. The second convolution unit performs a convolution to output an unsharp image signal according to the original image signal and a low pass filter mask. The arithmetic unit outputs a first sharpening signal according to the original image signal, the unsharp image signal and the weight coefficient. The outputting unit outputs a processed image signal according to the original image signal and the first sharpening signal.

According to a second aspect of the present invention, an image processing method is provided. The image processing method includes the following steps. First, an original image signal is inputted. Next, a high pass filter mask is inputted. Then, a convolution is performed to output edge strength according to the original image signal and the high pass filter mask. Next, a weight coefficient is chosen according to the edge strength. Then, a low pass filter mask is inputted. Next, the convolution is performed to output an unsharp image signal according to the original image signal and the low pass filter mask. Then, a first sharpening signal is outputted according to the original image signal, the unsharp image signal and the weight coefficient. Finally, a processed image signal is outputted according to the original image signal and the first sharpening signal.

The invention will become apparent from the following detailed description of the preferred but non-limiting embodiments. The following description is made with reference to the accompanying drawings.

BRIEF DESCRIPTION OF THE DRAWINGS

FIG. 12 is a schematic illustration showing a high pass filter mask L.

FIG. 13 is a schematic illustration showing a low pass filter mask S.

FIG. 14 is another schematic illustration showing the low pass filter mask S.

DETAILED DESCRIPTION OF THE INVENTION

When the conventional image processing apparatus is scanning, printing or photographing, the image edges tend to be blurred or distorted. The embodiments of the invention disclose an image processing apparatus and an image processing method for determining a weight coefficient of each pixel according to edge strength of the image. A smaller weight coefficient is assigned to the pixel of the image having the larger edge strength, and a larger weight coefficient is assigned to the pixel of the image having the smaller edge strength. Thus, the blurred region in the original image can be effectively enhanced. Also, the following embodiments can avoid the defect caused by the over-enhancement so that texts can be correctly displayed and the better display effect can be achieved.

Figure 1:
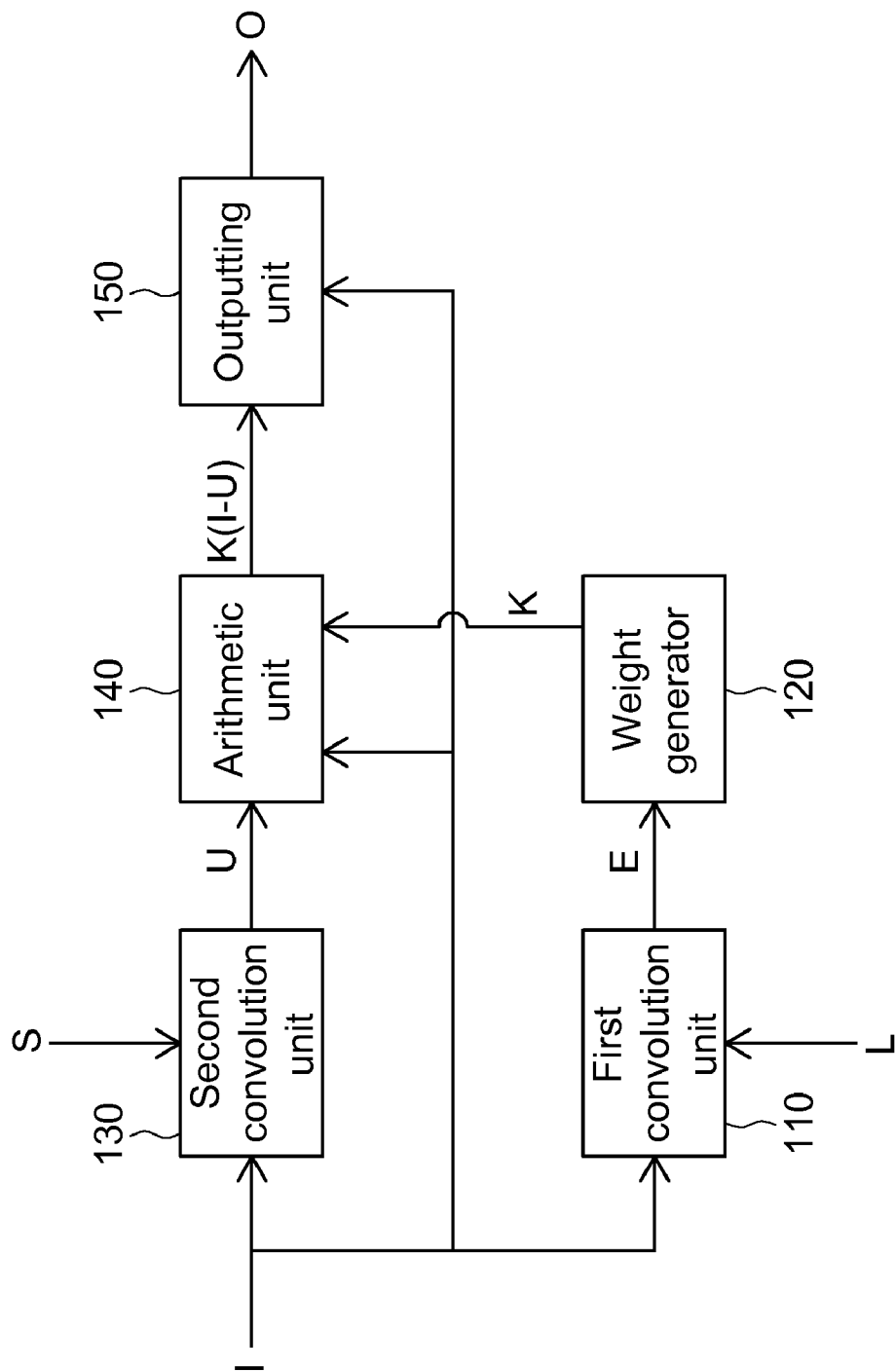
FIG. 1 is a block diagram showing an image processing apparatus according to a preferred embodiment of the invention.

FIG. 1 is a block diagram showing an image processing apparatus according to a preferred embodiment of the invention. FIG. 12 is a schematic illustration showing a high pass filter mask L. FIG. 13 is a schematic illustration showing a low pass filter mask S. FIG. 14 is another schematic illustration showing the low pass filter mask S.

An image processing apparatus 10 performs the image processing on an original image signal I, and then outputs a processed image signal O to a display apparatus, which generates a display frame containing multiple pixels. The original image signal I is a black-and-white image (or a gray level image) having the gray level values ranging from 0 to 255, or a black-and-white image having the gray level values ranging between other values.

The image processing apparatus 10 includes a first convolution unit 110, a weight generator 120, a second convolution unit 130, an arithmetic unit 140 and an outputting unit 150. For example, the first convolution unit 110 and the second convolution unit 130 are two-dimensional convolution units, and the first convolution unit 110 performs a convolution to output edge strength E according to the original image signal I and the high pass filter mask L, wherein the edge strength E=the original image signal I ⊗the high pass filter mask L, and the symbol of convolution is defined as ⊗.

In order to make the invention clearer and be easily understood, an aspect of the high pass filter mask L will be described with reference to FIG. 12, wherein the high pass filter mask L of FIG. 12 is sequentially −1, −1, −1, −1, 8, −1, −1, −1 and −1 from the left top side to the right bottom side. However, the invention is not restricted thereto, and one of ordinary skill in the art may easily modify the mask without departing from the spirit and scope of the invention.

The weight generator 120 chooses a weight coefficient K according to the edge strength E outputted from the first convolution unit 110. Because the weight coefficient K of each pixel is adaptively adjusted, the frame quality can be enhanced, and the objective of correctly displaying the texts can be achieved.

The second convolution unit 130 performs a convolution to output an unsharp image signal U according to the original image signal I and the low pass filter mask S, wherein the unsharp image signal U=the original image signal I ⊗the low pass filter mask S.

In order to make the invention clearer and be easily understood, two aspects of the low pass filter mask S will be illustrated in FIGS. 13 and 14, wherein the low pass filter mask S of FIG. 13 is sequentially 1/9, 1/9, 1/9, 1/9, 1/9, 1/9, 1/9, 1/9 and 1/9 from the left top side to the right bottom side, and the low pass filter mask S of FIG. 14 is sequentially 1/16, 2/16, 1/16, 2/16, 4/16, 2/16, 1/16, 2/16 and 1/16 from the left top side to the right bottom side. However, the invention is not restricted thereto, and one of ordinary skill in the art may easily modify the mask without departing from the spirit and scope of the invention.

The arithmetic unit 140 outputs a first sharpening signal K(I-U) according to the original image signal I, the unsharp image signal U and the weight coefficient K. The outputting unit 150 receives the first sharpening signal K(I-U), and then outputs the processed image signal O according to the original image signal I and the first sharpening signal K(I-U).

In order to enhance the sharpness of the image edge, two curves of the edge strength versus the weight coefficient will be described in FIGS. 2 and 3 so that the weight generator 120 can thus choose the proper weight coefficient K.

Figure 2:
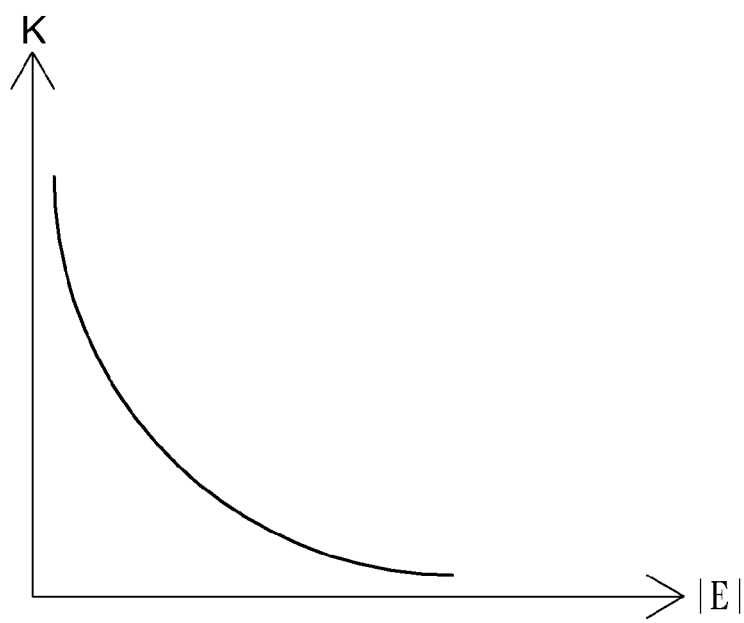
FIG. 2 shows a first curve of the edge strength versus the weight coefficient.

FIG. 2 shows a first curve of the edge strength versus the weight coefficient. FIG. 3 shows a second curve of the edge strength versus the weight coefficient. In FIG. 2, the bigger the absolute value of the edge strength E is, the smaller the weight coefficient is, and vice versa. In FIG. 3, the weight coefficient K is equal to an enhanced value a3 when the absolute value of the edge strength E ranges between the default value 0 and the default value b1; the weight coefficient K is equal to an enhanced value a2 when the absolute value of the edge strength E ranges between the default value b1 and the default value b2; the weight coefficient K is equal to an enhanced value a1 when the absolute value of the edge strength E ranges between the default value b2 and the default value b3; and the weight coefficient K is equal to an enhanced value 0 when the absolute value of the edge strength E ranges between the default value b3 and the default value b4.

Figure 3:
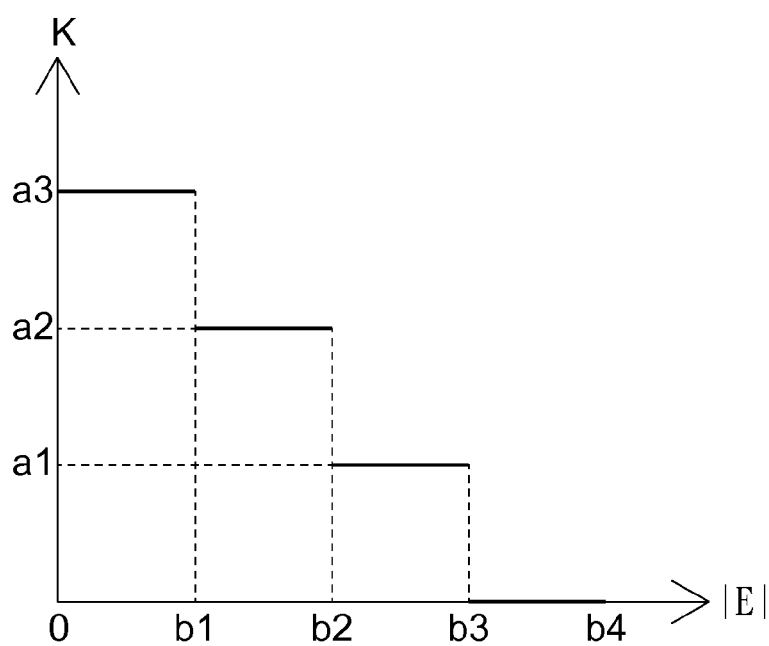
FIG. 3 shows a second curve of the edge strength versus the weight coefficient.

Thus, the smaller weight coefficient K is assigned when the edge strength E is larger in either FIG. 2 or FIG. 3. On the contrary, the larger weight coefficient K is assigned when the edge strength E is smaller. Consequently, the image profile may become more obvious in the visual feeling so that the image quality can be enhanced. Furthermore, the curves of FIGS. 2 and 3 are only for the illustrative purpose, and other curves with the same features can be adapted to the invention.

Figure 4:
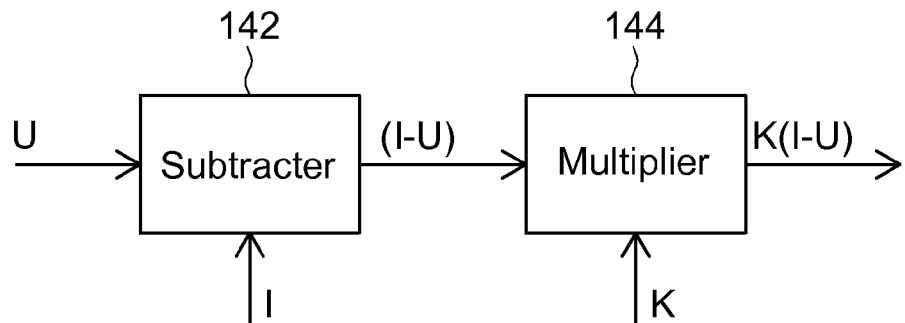
FIG. 4 is a detailed block diagram showing an arithmetic unit 140.
Figure 5:
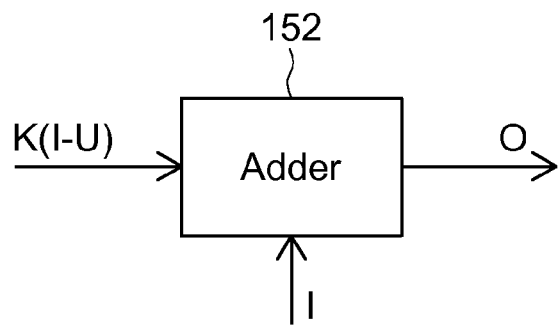
FIG. 5 is a first detailed block diagram showing an outputting unit 150.
Figure 6:
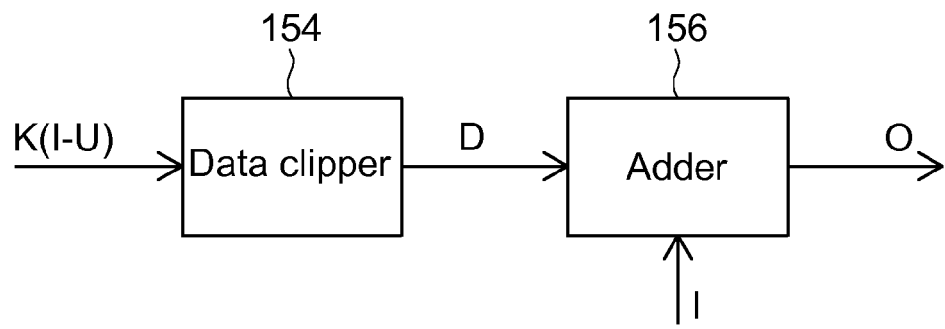
FIG. 6 is a second detailed block diagram showing the outputting unit 150.

In order to make the invention clearer and be easily understood, detailed block diagrams of the arithmetic unit 140 and the outputting unit 150 will be respectively illustrated in FIGS. 4 to 6.

FIG. 4 is a detailed block diagram showing the arithmetic unit 140. Referring to FIG. 4, the arithmetic unit 140 of FIG. 1 further includes a subtracter 142 and a multiplier 144. The subtracter 142 subtracts the unsharp image signal U from the original image signal I to obtain a second sharpening signal (I-U). The multiplier 144 multiplies the second sharpening signal (I-U) and the weight coefficient K together to obtain the first sharpening signal K(I-U).

FIG. 5 is a first detailed block diagram showing the outputting unit 150. Referring to FIG. 5, the outputting unit 150 of FIG. 1 is, for example, an outputting unit 150(1) which includes an adder 152. The adder 152 adds the original image signal I and the first sharpening signal K(I-U) together and then outputs the processed image signal O.

FIG. 6 is a second detailed block diagram showing the outputting unit 150. In addition, the outputting unit 150 of the FIG. 1 may also be, for example, an outputting unit 150(2) which includes a data clipper 154 and an adder 156.

The data clipper 154 judges whether or not the first sharpening signal K(I-U) is greater than a threshold value and thus selectively outputs the first sharpening signal K(I-U) or the threshold value to the adder 156. The adder 156 adds the first sharpening signal K(I-U) or the threshold value and the original image signal I together and then outputs the processed image signal O.

In detail, if the absolute value of the first sharpening signal K(I-U) is smaller than or equal to the threshold value, the data clipper 154 outputs the first sharpening signal K(I-U) to the adder 156. The adder 156 adds the first sharpening signal K(I-U) and the original image signal I together and then outputs the processed image signal O.

On the contrary, when the absolute value of the first sharpening signal K(I-U) is greater than the threshold value, the data clipper 154 outputs the threshold value to the adder 156. The adder 156 adds the threshold value and the original image signal I together and then outputs the processed image signal O. The threshold value can be defined according to the requirement of the designer.

Figure 7:
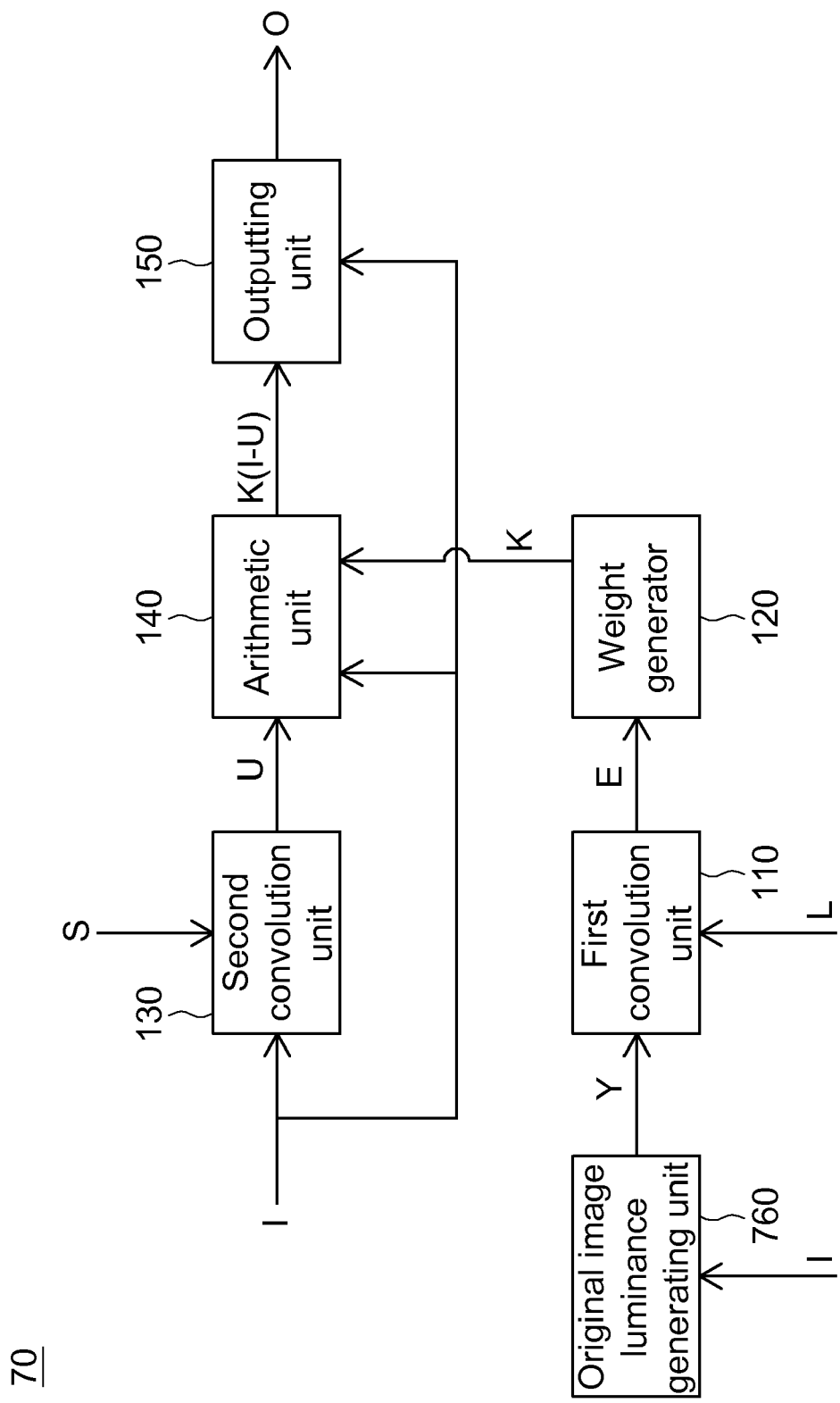
FIG. 7 is a block diagram showing an image processing apparatus according to another preferred embodiment of the invention.

FIG. 7 is a block diagram showing an image processing apparatus 70 according to another preferred embodiment of the invention. As shown in FIG. 7, the difference between the image processing apparatus 70 and the image processing apparatus 10 is that the original image signal I received by the image processing apparatus 70 includes the RGB signals of the color image, and the image processing apparatus 70 processes the RGB signals and then outputs the sharpened RGB signals.

In detail, the image processing apparatus 70 further includes an original image luminance generating unit 760 for converting the original image signal I from the RGB color spatial domain into the YCbCr color spatial domain, wherein Y represents the original image luminance, and Cb and Cr represent the chrominance, and Y=0.299R+0.587G+0.114B.

The original image luminance generating unit 760 generates an original image luminance Y according to the original image signal I and outputs the original image luminance Y to the first convolution unit 110. The first convolution unit 110 performs the convolution to output the edge strength E to the weight generator 120 according to the original image luminance Y of the original image signal I and the high pass filter mask L. The weight generator 120 chooses the suitable weight coefficient K according to the edge strength E. Because the weight coefficient K of each pixel is adaptively adjusted, the frame quality can be enhanced and the object of correctly displaying the texts also can be achieved.

Figure 8:
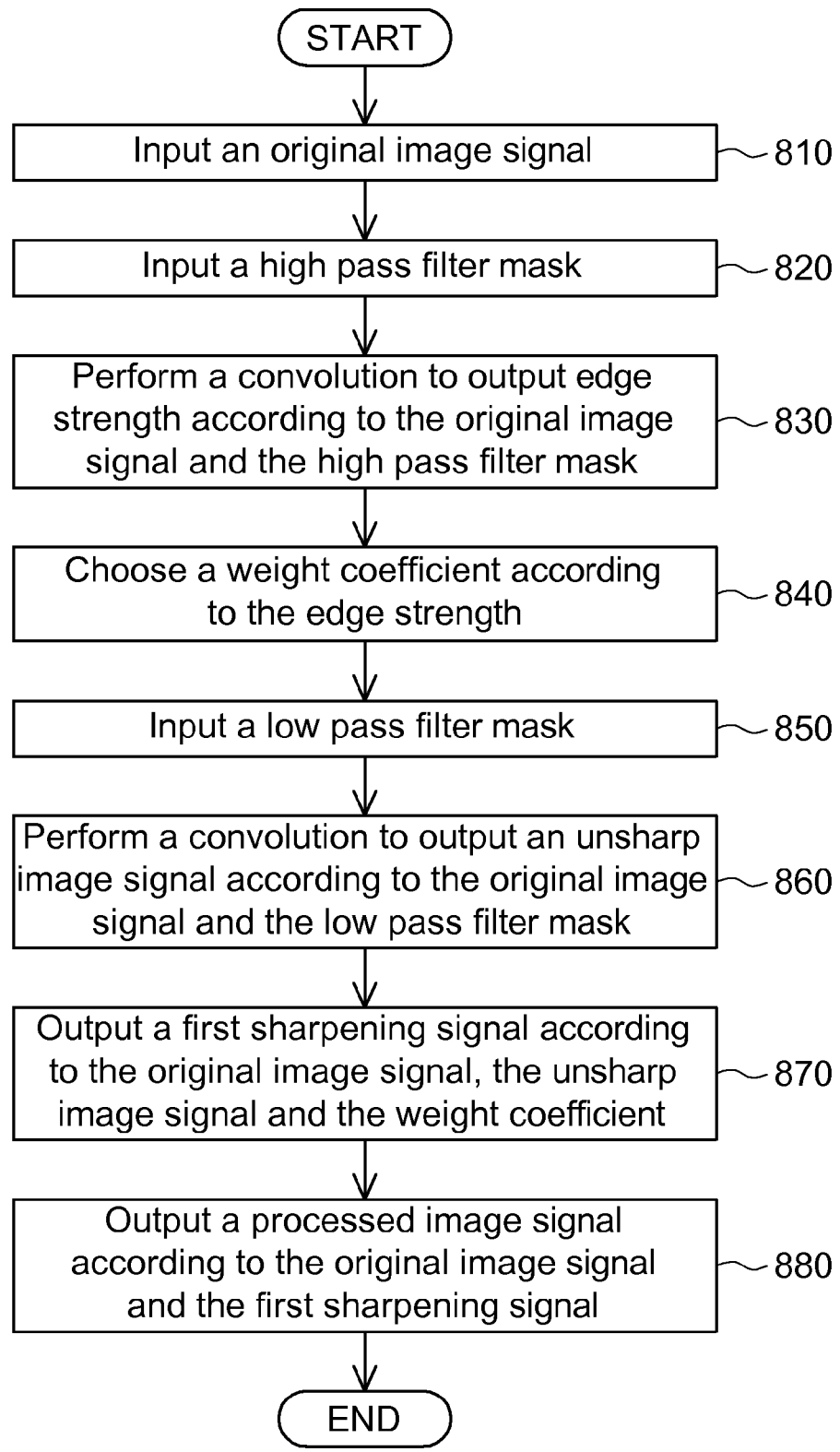
FIG. 8 is a flow chart showing an image processing method according to a preferred embodiment of the invention.

FIG. 8 is a flow chart showing an image processing method according to a preferred embodiment of the invention. Referring to FIG. 8, the image processing method includes the following steps. First, as shown in step 810, the original image signal I is inputted. Next, as shown in step 820, the high pass filter mask L is inputted. Then, as shown in step 830, the convolution is performed to output the edge strength E according to the original image signal I and the high pass filter mask L. Next, as shown in step 840, the weight coefficient K is chosen according to the edge strength E.

Then, as shown in step 850, the low pass filter mask S is inputted. Next, as shown in step 860, the convolution is performed to output the unsharp image signal U according to the original image signal I and the low pass filter mask S. Then, as shown in step 870, the first sharpening signal K(I-U) is outputted according to the original image signal I, the unsharp image signal U and the weight coefficient K. Finally, as shown in step 880, the processed image signal O is outputted according to the original image signal I and the first sharpening signal K(I-U).

However, it is also possible to perform the steps 850 and 860 to obtain the value U, then perform the steps 810 to 840 to obtain the value K, and finally perform the steps 870 and 880 to output the processed image signal O. Alternatively, the steps 810 to 840 and the steps 850 and 860 are synchronously performed to respectively obtain the values K and U, and then the steps 870 and 880 are performed to output the processed image signal O. The final results obtained according to the three ways stated hereinabove are the same, and only the orders of the steps are different from one another. So, detailed descriptions thereof will be omitted.

Figure 9:
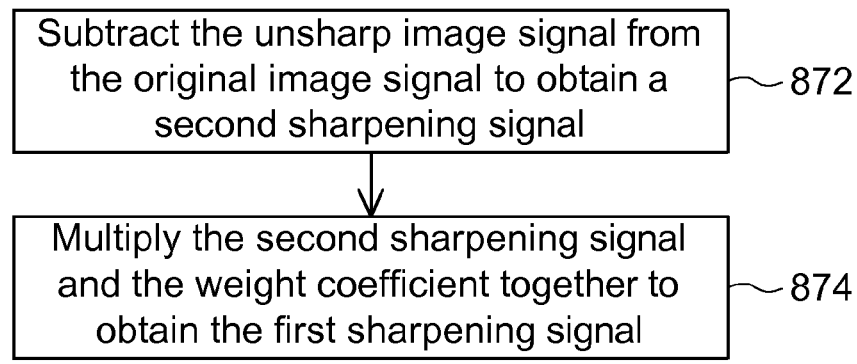
FIG. 9 is a detailed flow chart showing the step 870.

FIG. 9 is a detailed flow chart showing the step 870. Referring to FIG. 9, the step 870 further includes the following steps. First, as shown in step 872, the unsharp image signal U is subtracted from the original image signal I to obtain the second sharpening signal (I-U). Next, as shown in step 874, the second sharpening signal (I-U) and the weight coefficient K are multiplied together to obtain the first sharpening signal K(I-U).

Figure 10:
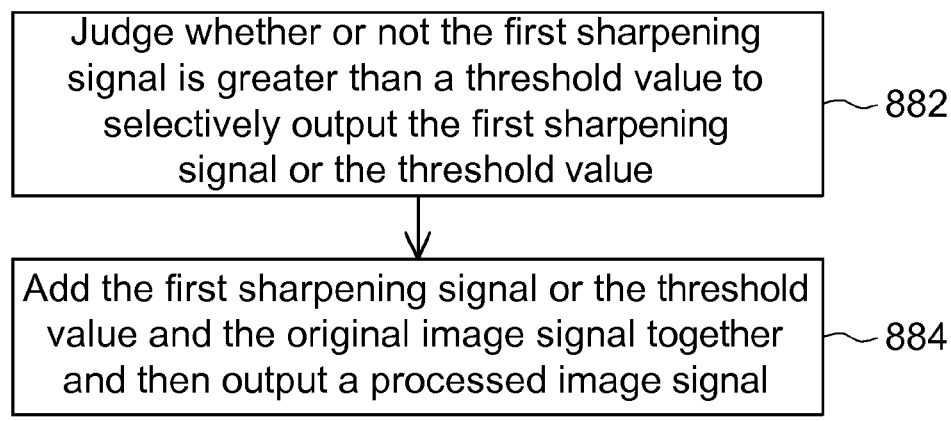
FIG. 10 is a detailed flow chart showing the step 880.

FIG. 10 is a detailed flow chart showing the step 880. Referring to FIG. 10, the step 880 is to add the original image signal I and the first sharpening signal K(I-U) together and then output the processed image signal O. In addition, the step 880 may also include the following steps.

First, as shown in step 882, it is judged whether or not the first sharpening signal K(I-U) is greater than the threshold value to selectively output the first sharpening signal K(I-U) or the threshold value. Next, as shown in step 884, the first sharpening signal K(I-U) or the threshold value and the original image signal I are added together to output the processed image signal O.

Figure 11:
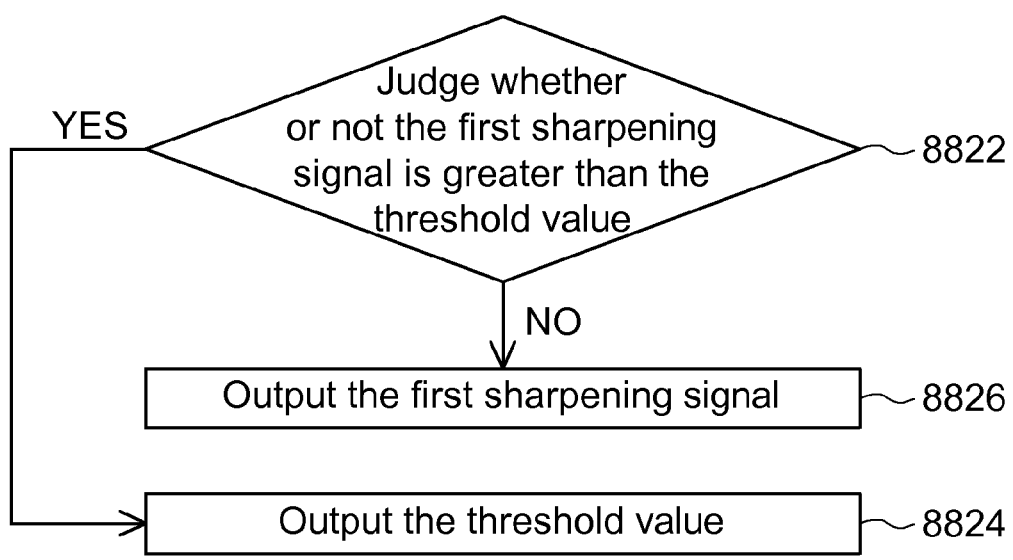
FIG. 11 is a detailed flow chart showing the step 884.

FIG. 11 is a detailed flow chart showing the step 882. Referring to FIG. 11, the step 882 further includes the following steps. First, as shown in step 8822, it is judged whether or not the first sharpening signal K(I-U) is greater than the threshold value. Next, as shown in step 8826, the first sharpening signal K(I-U) is outputted when the absolute value of the first sharpening signal K(I-U) is smaller than or equal to the threshold value. On the contrary, the threshold value is outputted when the absolute value of the first sharpening signal K(I-U) is greater than the threshold value, as shown in step 8824.

The image processing apparatus and the image processing method according to the embodiments of the invention can enhance the image edge so that the profile of the image becomes more obvious. In addition, the weight coefficient of each pixel is adaptively adjusted. So, when the edge strength at a certain position of the image is large enough, the pixel at this position is not sharpened so that the texts can be displayed more correctly. Thus, the image processing apparatus and the image processing method according to the embodiment of the invention can enhance the frame quality and correctly display the texts.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing apparatus, comprising:
   a first convolution unit for performing a convolution to output edge strength according to an original image signal and a high pass filter mask;
   a weight generator for choosing a weight coefficient according to the edge strength, wherein an absolute value of the edge strength is bigger, when the weight coefficient is smaller and an absolute value of the edge strength is smaller, when the weight coefficient is bigger;
   a second convolution unit for performing a convolution to output an unsharp image signal according to the original image signal and a low pass filter mask;
   an arithmetic unit for outputting a first sharpening signal according to the original image signal, the unsharp image signal and the weight coefficient; and
   an outputting unit for outputting a processed image signal according to the original image signal and the first sharpening signal.

2. The apparatus according to claim 1, wherein the arithmetic unit comprises:
   a subtracter for subtracting the unsharp image signal from the original image signal to obtain a second sharpening signal; and
   a multiplier for multiplying the second sharpening signal and the weight coefficient together to obtain the first sharpening signal.

3. The apparatus according to claim 1, wherein the outputting unit comprises:

an adder for adding the original image signal and the first sharpening signal together and then outputting the processed image signal.

4. The apparatus according to claim 1, wherein the outputting unit comprises:
a data clipper for judging whether or not the first sharpening signal is greater than a threshold value, and thus selectively outputting the first sharpening signal or the threshold value; and
an adder for adding the first sharpening signal or the threshold value and the original image signal together and then outputting the processed image signal.

5. The apparatus according to claim 4, wherein the data clipper outputs the first sharpening signal when an absolute value of the first sharpening signal is smaller than or equal to the threshold value, and the data clipper outputs the threshold value when the absolute value of the first sharpening signal is greater than the threshold value.

6. The apparatus according to claim 1, wherein the first convolution unit performs the convolution to output the edge strength according to an original image luminance of the original image signal and the high pass filter mask.

7. The apparatus according to claim 6, further comprising:
an original image luminance generating unit for generating the original image luminance according to the original image signal and outputting the original image luminance to the first convolution unit.

8. The apparatus according to claim 1, wherein the weight coefficient is equal to a first enhanced value when an absolute value of the edge strength ranges between a first default value and a second default value, and the weight coefficient is equal to a second enhanced value when the absolute value of the edge strength ranges between the second default value and a third default value.

9. The apparatus according to claim 1, wherein the first convolution unit is a two-dimensional convolution unit.

10. The apparatus according to claim 1, wherein the second convolution unit is a two-dimensional convolution unit.

11. An image processing method, comprising the steps of:
(a) inputting an original image signal;
(b) inputting a high pass filter mask;
(c) performing a convolution to output edge strength according to the original image signal and the high pass filter mask;
(d) choosing a weight coefficient according to the edge strength, wherein an absolute value of the edge strength is bigger, when the weight coefficient is smaller and an absolute value of the edge strength is smaller, when the weight coefficient is bigger;
(e) inputting a low pass filter mask;
(f) performing a convolution to output an unsharp image signal according to the original image signal and the low pass filter mask;
(g) outputting a first sharpening signal according to the original image signal, the unsharp image signal and the weight coefficient; and
(h) outputting a processed image signal according to the original image signal and the first sharpening signal.

12. The method according to claim 11, wherein the step (g) comprises:
(g1) subtracting the unsharp image signal from the original image signal to obtain a second sharpening signal; and
(g2) multiplying the second sharpening signal and the weight coefficient together to obtain the first sharpening signal.

13. The method according to claim 11, wherein the original image signal and the first sharpening signal are added together and then the processed image signal is outputted in the step (h).

14. The method according to claim 11, wherein the step (h) comprises:
(h1) judging whether or not the first sharpening signal is greater than a threshold value to selectively output the first sharpening signal or the threshold value; and
(h2) adding the first sharpening signal or the threshold value and the original image signal together and then outputting the processed image signal.

15. The method according to claim 14, wherein the step (h1) comprises:
(h1-1) judging whether or not the first sharpening signal is greater than the threshold value;
(h1-2) outputting the first sharpening signal when an absolute value of the first sharpening signal is smaller than or equal to the threshold value; and
(h1-3) outputting the threshold value when the absolute value of the first sharpening signal is greater than the threshold value.

16. The method according to claim 11, wherein the convolution is performed to output the edge strength according to an original image luminance of the original image signal and the high pass filter mask in the step (c).

17. The method according to claim 11, wherein the weight coefficient is equal to a first enhanced value when an absolute value of the edge strength ranges between a first default value and a second default value, and the weight coefficient is equal to a second enhanced value when the absolute value of the edge strength ranges between the second default value and a third default value.

* * * * *